United States Patent
North

(10) Patent No.: US 6,818,033 B2
(45) Date of Patent: Nov. 16, 2004

(54) DUST/PARTICLE COLLECTING ARRANGEMENT FOR CYCLONE SEPARATORS

(76) Inventor: John Herbert North, 21, Briar Court, Guardian Road, Norwich, NR5 8PR (GB)

( * ) Notice: Subject to any disclaimer, the term of this patent is extended or adjusted under 35 U.S.C. 154(b) by 37 days.

(21) Appl. No.: 10/312,929

(22) PCT Filed: Jul. 5, 2001

(86) PCT No.: PCT/GB01/02990

§ 371 (c)(1),
(2), (4) Date: Dec. 30, 2002

(87) PCT Pub. No.: WO02/03844

PCT Pub. Date: Jan. 17, 2002

(65) Prior Publication Data

US 2003/0159412 A1 Aug. 28, 2003

(30) Foreign Application Priority Data

Jul. 6, 2000 (GB) .............................................. 0016501
Jul. 6, 2000 (GB) .............................................. 0016503

(51) Int. Cl.⁷ ............................................. B01D 45/16
(52) U.S. Cl. ............................ 55/345; 55/429; 55/432; 55/459.1; 55/DIG. 3; 96/405; 210/512.2
(58) Field of Search .............................. 55/345, 459.1, 55/429–432, DIG. 3; 210/512.2; 96/405, 406

(56) References Cited

U.S. PATENT DOCUMENTS

| 2,569,710 | A | | 10/1951 | Fitzpatrick ..................... 55/396 |
|---|---|---|---|---|
| 2,797,077 | A | * | 6/1957 | Muller ............................ 34/58 |
| 3,052,361 | A | * | 9/1962 | Whatley et al. .......... 210/512.2 |
| 3,243,043 | A | * | 3/1966 | Thompson et al. .......... 210/788 |
| 3,489,111 | A | * | 1/1970 | Montgomery ........... 110/165 R |
| 4,284,422 | A | * | 8/1981 | Ferland ........................ 55/300 |
| 4,691,407 | A | * | 9/1987 | Sloan et al. ................... 15/339 |
| 4,826,515 | A | * | 5/1989 | Dyson .......................... 55/345 |
| 4,971,603 | A | * | 11/1990 | Prinsloo et al. ............... 95/269 |
| 4,976,850 | A | | 12/1990 | Kulitz ......................... 210/104 |
| 5,145,499 | A | * | 9/1992 | Dyson .......................... 55/337 |
| 5,160,356 | A | * | 11/1992 | Dyson .......................... 55/345 |
| 5,281,245 | A | * | 1/1994 | Yang ............................ 55/345 |
| 5,762,666 | A | * | 6/1998 | Amrein et al. ................ 55/425 |
| 5,951,863 | A | | 9/1999 | Kruger et al. ......... 210/321.71 |

FOREIGN PATENT DOCUMENTS

| GB | 477621 | | 1/1938 | |
|---|---|---|---|---|
| GB | 812521 | | 4/1959 | |
| GB | 1505166 | | 3/1978 | |
| JP | 59-49817 | * | 3/1984 | ............... 55/459.1 |
| WO | WO 98/35601 A1 | | 8/1998 | |
| WO | WO 99/22873 A1 | | 5/1999 | |

* cited by examiner

*Primary Examiner*—Richard L. Chiesa
(74) *Attorney, Agent, or Firm*—Barnes & Thornburg LLP

(57) ABSTRACT

Apparatus is described for separating particulate material from an airstream established by suction. The apparatus comprises a primary separation chamber (12) in which particles are separated from the airstream therein by centrifugal force, a main particle collecting region (14) into which the particles separated by the primary separation can fall under gravity, and a secondary separation chamber (90) downstream of the primary chamber (12), to which air and particles not separated in the first chamber, pass. An air outlet in the secondary chamber allows air substantially free of particles to exit. An intermediate particle collecting region (22) is associated with the secondary chamber, in which particles collect after separation by centrifugal force from the air flowing through the secondary chamber (90). A valve (41) is provided between the intermediate particle collecting (22) region and a second particle collecting region (14), which is closed while air flows through the apparatus but which is opened when airflow ceases, to allow particles in the intermediate region (22) to pass into the second region (14).

16 Claims, 8 Drawing Sheets

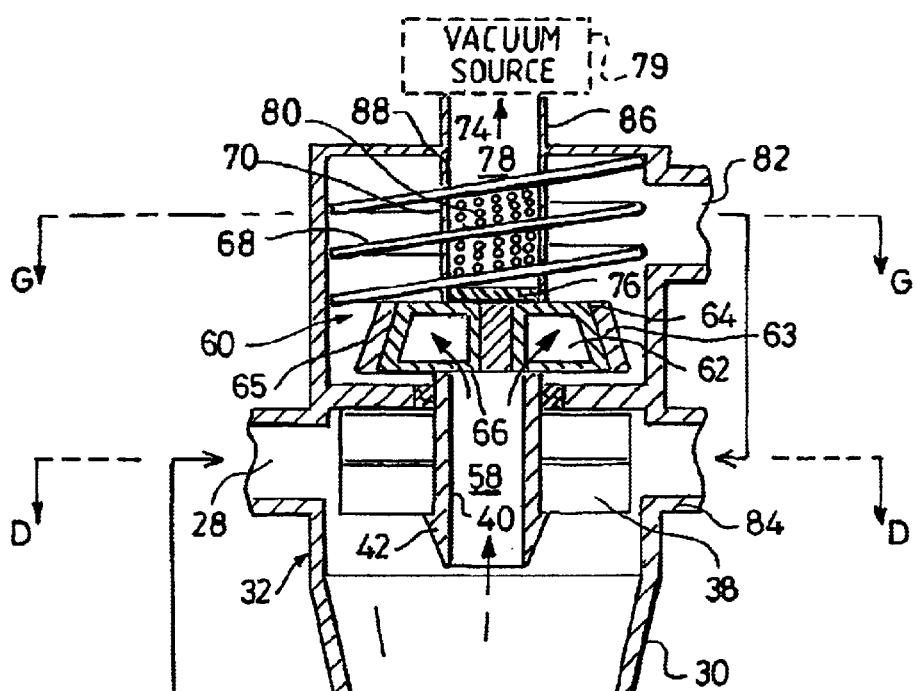
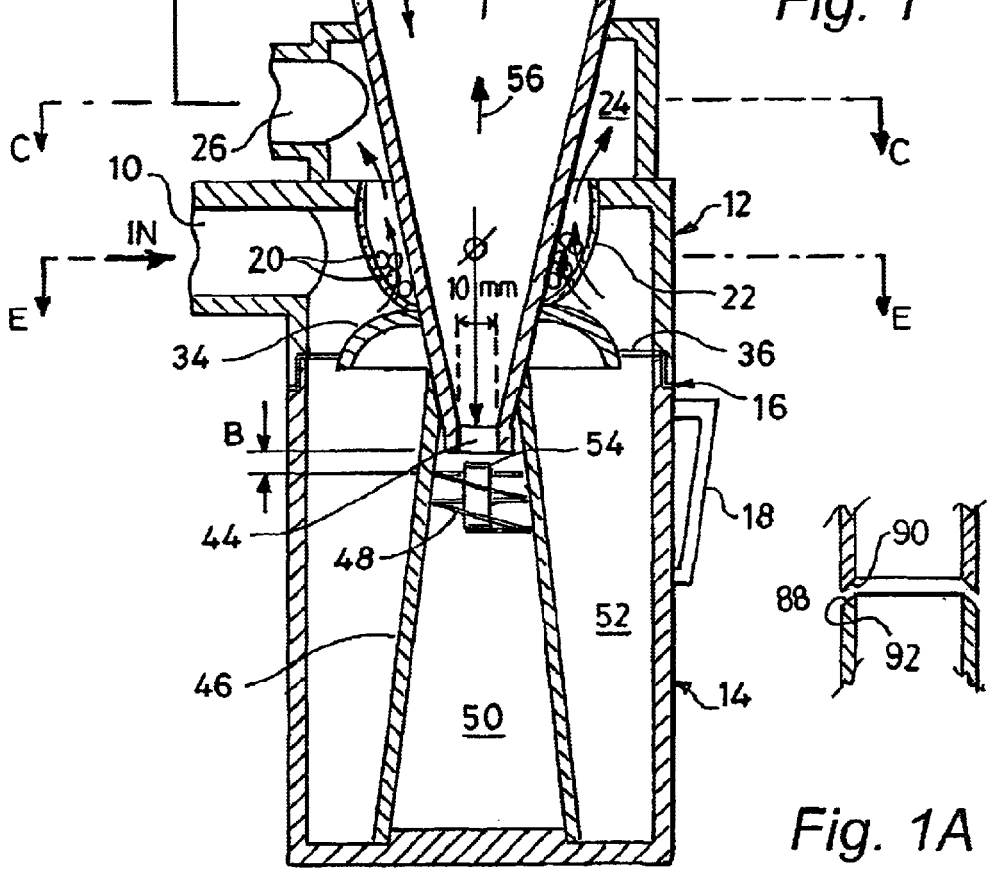
Fig. 1
Fig. 1A

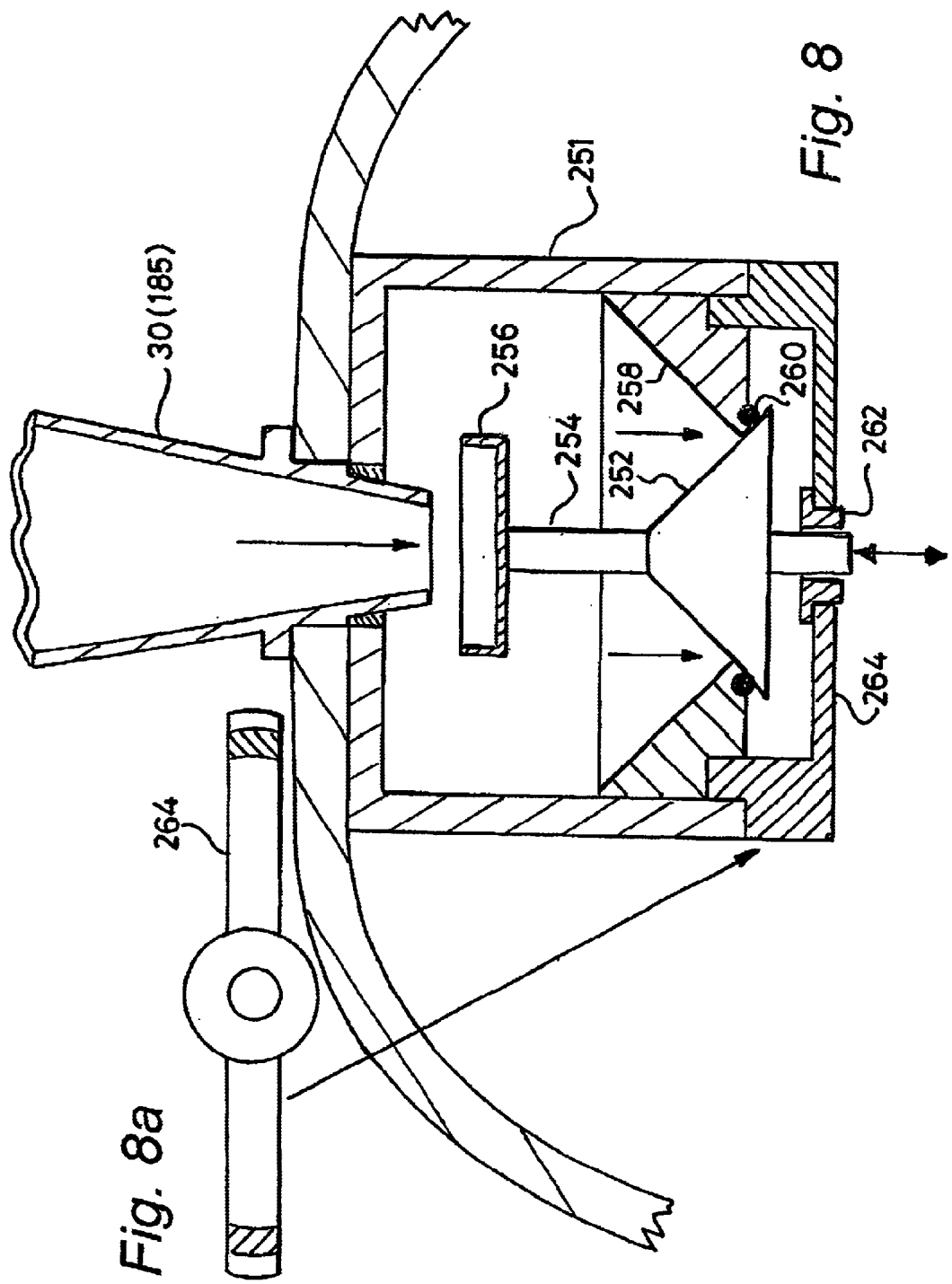

US 6,818,033 B2

DUST/PARTICLE COLLECTING ARRANGEMENT FOR CYCLONE SEPARATORS

FIELD OF INVENTION

The invention concerns separators which separate one material from another based on their relative densities. In a domestic context a cyclone-based vacuum cleaner is a separator for separating dirt and dust particles from air. Similar devices are employed in industrial and commercial processes, in laboratories and in clinical and hospital environments for separating particulate material from fluids—normally air or gaseous mixture; or particulate material for liquids. In particular, but not exclusively the invention is applicable to vacuum cleaners in which one or more cyclones are set up within the apparatus for the purpose of efficiently separating dust and dirt particles from an incoming airstream.

BACKGROUND TO THE INVENTION

In the separator/vacuum cleaner shown in PCT/GB98/03306, the collector 14 receives dust and dirt particles which have been separated by the secondary cyclone effect in the conical chamber 73. Dust and particles from the primary cyclone separation effect in the region 13, are collected in region 31 of collector 32, and when the level of the dust and particles in 31 gets close to the flange 21, the collector 32 must be emptied.

For satisfactory operation, the interior of 14 must be kept separate from 31.

However in practice it is found that even when 31 is full, the volume of dust and dirt particles in 14 is a small fraction of that in 31, and the useful volume of 32 is very substantially reduced by the secondary cyclone collection chamber 14.

OBJECT OF THE INVENTION

It is an object of the present invention to provide an improved particle collecting arrangement for collecting particles from two separation stages of a multistage air/particle separator.

SUMMARY OF THE INVENTION

1. According to the present invention apparatus for separating particulate material from an airstream established by suction, comprises:
   (1) a primary separation chamber in which particles are separated from the airstream therein by centrifugal force;
   (2) a main particle collecting region into which the particles separated by the primary separation can fall under gravity;
   (3) a secondary separation chamber downstream of the primary chamber, to which air and particles not separated in the first chamber, pass;
   (4) an air outlet in the secondary chamber through which air substantially free of particles can exit;
   (5) an intermediate particle collecting region associated with the secondary chamber, in which particles collect after separation by centrifugal force from the air flowing through the secondary chamber;
   (6) a valve between the intermediate particle collecting region and a second particle collecting region, which is closed while air flows through the apparatus but which is opened when airflow ceases to allow particles in the intermediate region to pass into the second region.

The second collecting region may be separate from the main particle collecting region, but advantageously the main particle collecting region also comprises the second particle collecting region.

The valve means is operable manually, or electrically, but preferably the valve operates in response to the flow of air through the apparatus so as to become closed when the air flow reaches and exceeds a given rate of flow, and opens when air fluid flow falls below a given rate of flow.

The valve may comprise a ball valve comprising a captive lightweight ball which is lifted by the airflow to close an orifice at one end of the secondary chamber, and which will fall back under gravity to open the orifice when the airflow ceases.

A baffle may be provided downstream of the valve to reduce the tendency for material beyond the valve to be sucked back through the valve while the air flow is being established.

A baffle may be located between the intermediate and second regions to create a tortuous path for particulate material therethrough.

In either event the baffle may comprise a helix.

The entry point of the helix may be spaced from the exit from the secondary separation chamber.

The gap between the entrance to the helix and the exit from the secondary separation chamber is in the range 4 to 6.4 mm.

The helix may have two complete turns.

Typically a gap of the order of 4 mm exists between the ball and the valve seating, when open.

The valve seating may include an annular seal so that when the ball is held thereagainst by suction, there is no tendency for air to leak past the ball.

Alternatively the closure member may present a conical or frusto-conical surface to an annular seating, which preferably includes an O-ring seal for engagement by the said surface to close the valve.

A spring may to advantage be provided acting on the ball or other closure in a direction to open the valve.

Preferably a level sensing device is provided in the or each particle collecting region to indicate when the contents of the collecting region has reached a given level, requiring it to be emptied.

The sensing device typically includes a switch for generating an alarm and/or interrupting the power supply to the suction producing means.

The invention is not limited to apparatus for separating particles from air but may be employed in apparatus operating in a similar way to separate particulate material from a liquid (where the particulate material is more dense than the liquid) or one liquid from another liquid (again where there is a difference in density of the two liquids).

The invention will now be described, by way of example, with reference to the accompanying drawings, in which.

Figure 2:
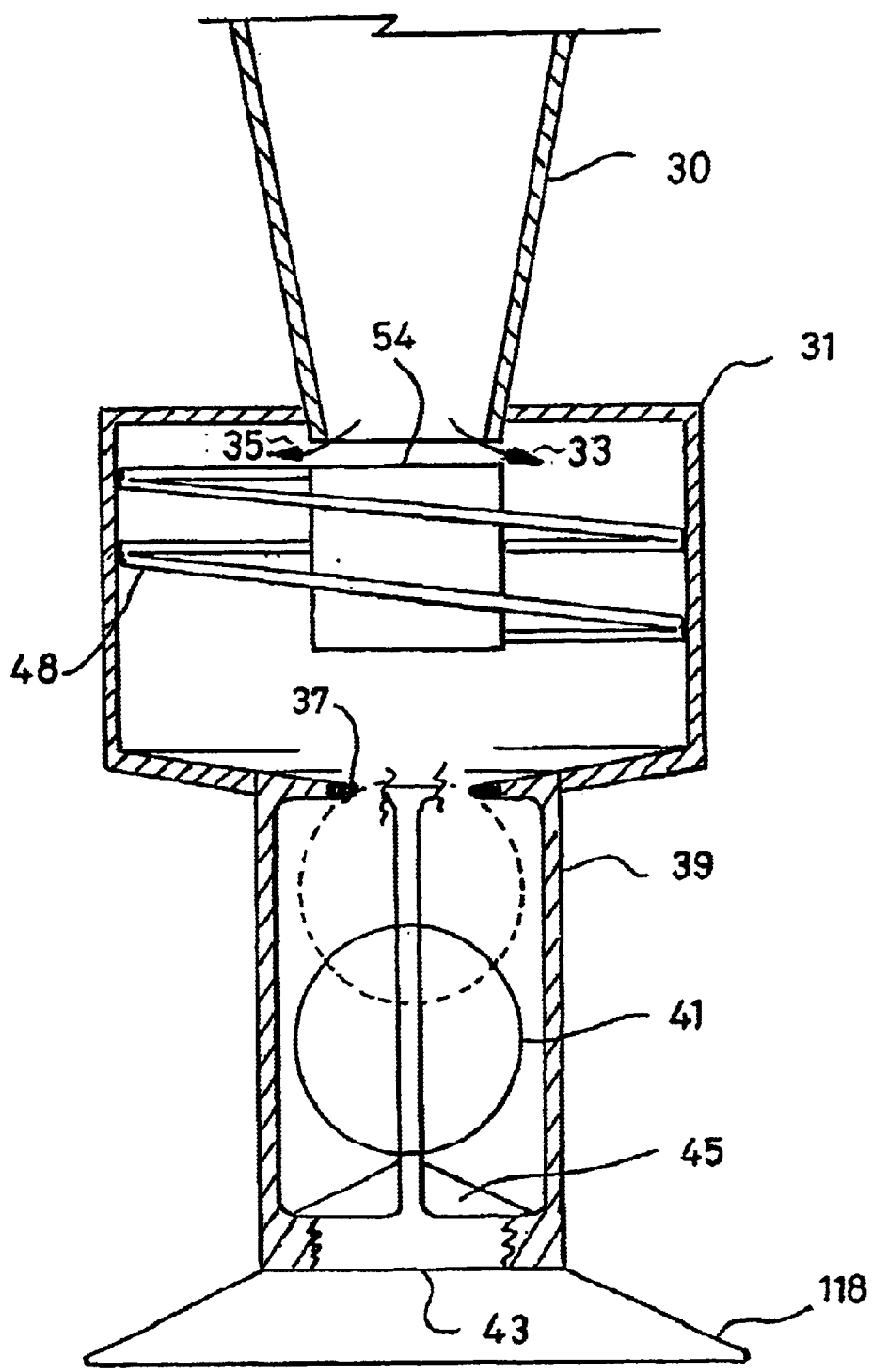
Figure 3:
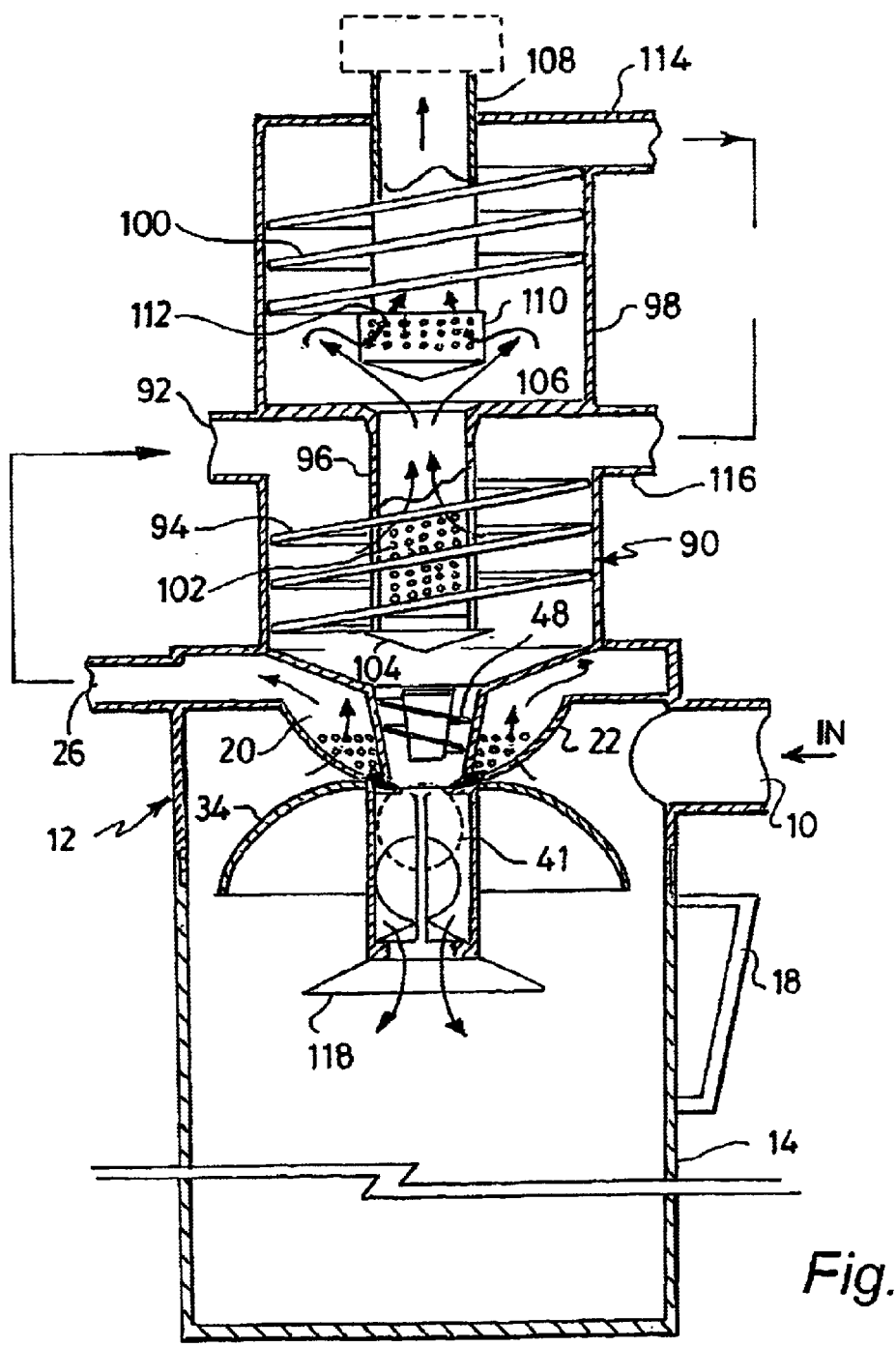
Figure 4:
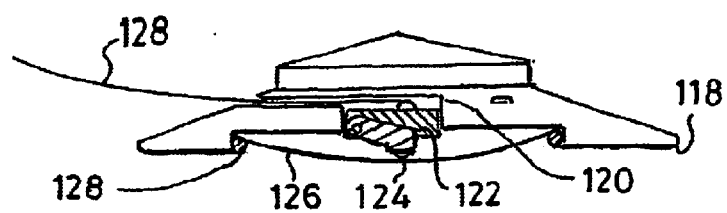
Figure 5:
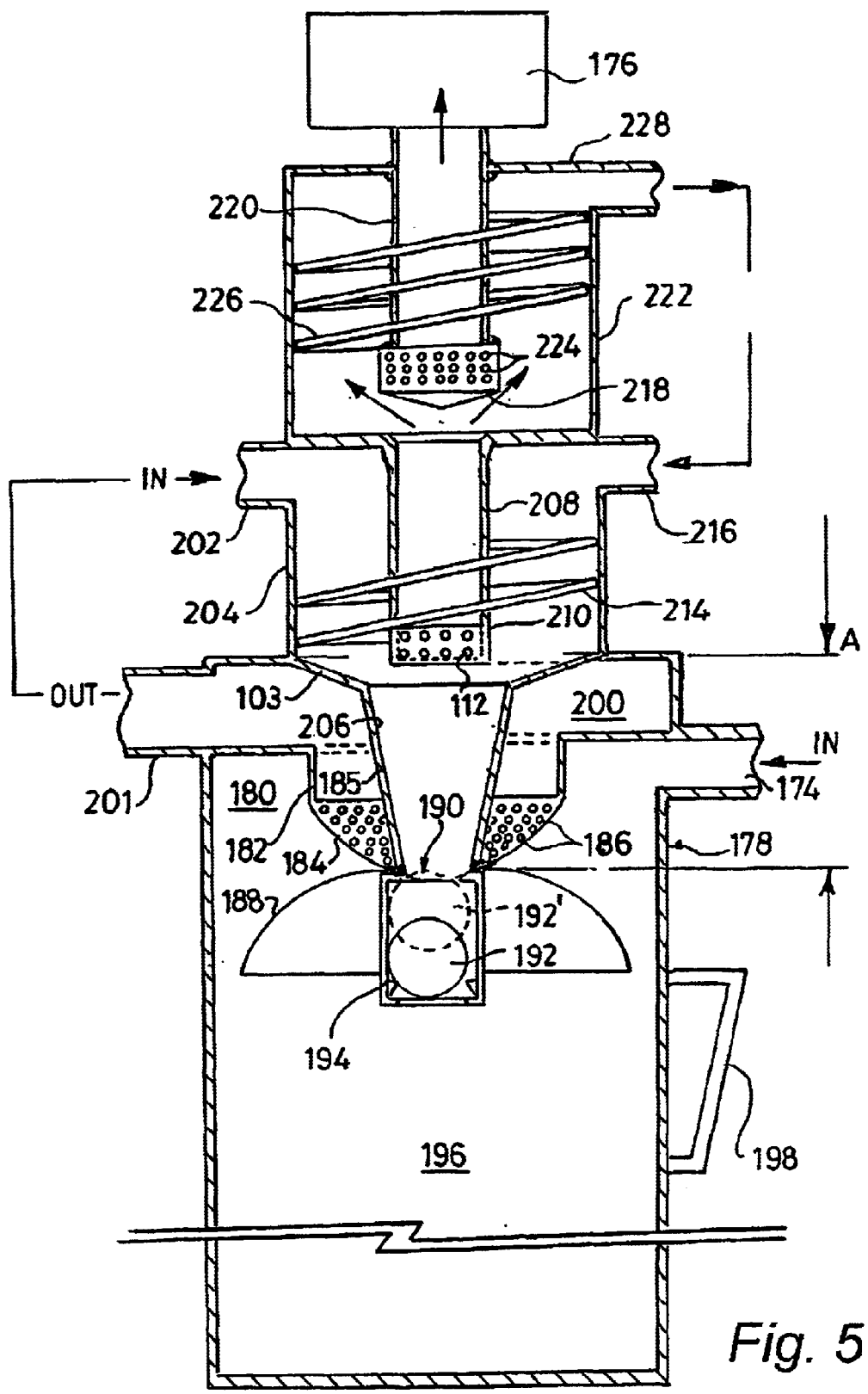
Figure 6:
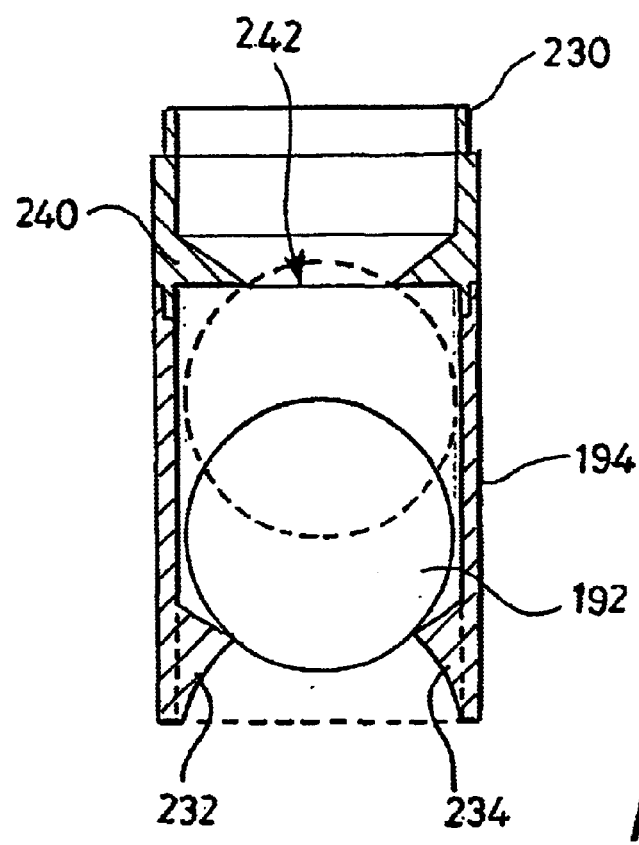
Figure 6A:
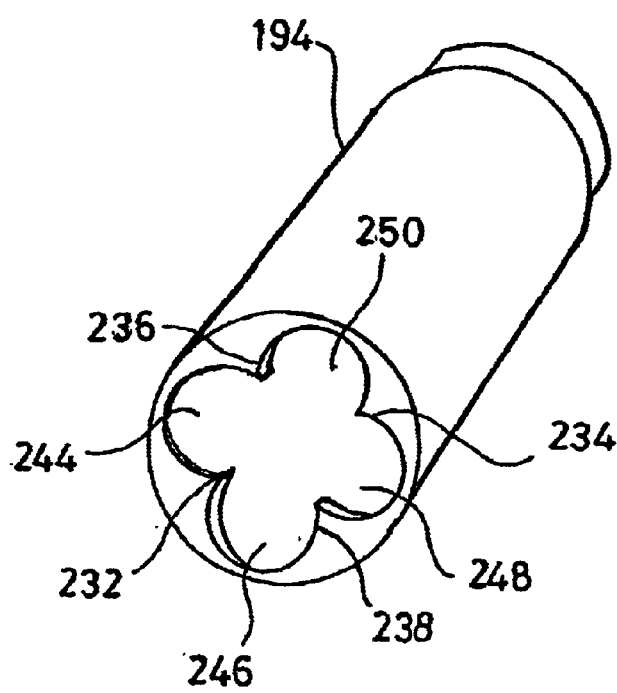
Figure 7:
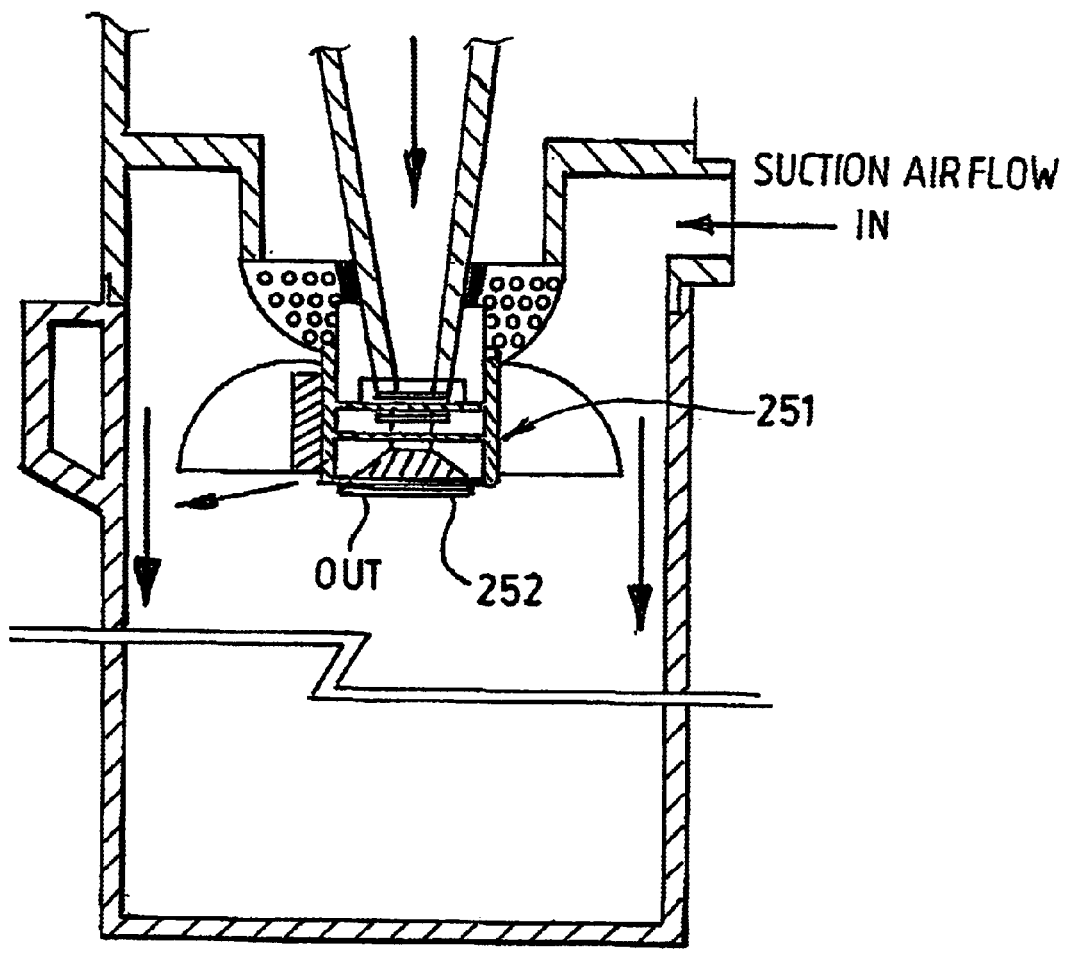

FIGS. 1B–G are cross-section views of the separator;

FIG. 3 is an elevation partly in cross-section of an alternative preferred three stage cyclone separator, modified to include a valve such as shown in FIG. 2, so as not to require a supplementary dust collecting bin;

FIG. 4 is a cross-section through a modified lower end into the flow control valve for sensing when the dust/particle content of the bin exceeds a given height;

FIG. 5 is a cross-sectional elevation of another three stage separator embodying the invention;

FIGS. 6 and 6A are a cross-sectional elevation and perspective view from below of a preferred ball-valve;

FIGS. 7 and 8 show a different form of separator and valve.

FIG. 8a is a scrap view of the cross member.

DETAILED DESCRIPTION OF THE DRAWINGS

FIG. 1 illustrates one embodiment of cyclone vacuum cleaner (separator) of the type to which the present invention can be applied.

As shown in the drawings, the device comprises a suction inlet 10 which can be connected to a hose and dust collecting wand, or to a rotating brush assembly such as is located in the base of a domestic or industrial upright vacuum cleaner.

The suction inlet enters tangentially a cylindrical enclosure generally designated 12 and the upper end of a dust and dirt collecting drum 14. The lower part 14 is typically a push-bit at 16 to the upper region 12 and includes a handle 18. When full, the drum 14 is detached from the upper end 12, and emptied. The push-fit must provide a good sealing joint between 12 and 14 or a separate ring seal must be included.

The tangential entrance of the air stream causes the incoming air to circulate around the interior of the cylindrical region 12 and because of the higher mass of dust particles relative to air particles, the dust and dirt entrained in the air stream tends to migrate to the outer ends of the rotating air stream and fall into the drum 14 whilst relatively dust free air tends to spiral inwardly to eventually pass through the plurality of openings such as 20 in the hemispherical dish generally designated 22 located axially centrally of the cylindrical region 12.

After passing through the holes 20, the air rises into the upper cylindrical cavity 24 from which it exits via port 26 and is conveyed to the inlet port 28 at the upper end of a conical chamber 30 in which the second stage of separation occurs.

The upper end 32 of the conical housing 30 is itself cylindrical and the entrance 28 communicates tangentially with that cylindrical region in the same way as inlet 10 communicates with the cylindrical region 12.

It will be appreciated that as the height of dust and particles in the drum 14 begins to rise, there could be a tendency for the rotating air stream in the region 12 to draw dust and particles from the heap in the bottom of drum 14, back into the air stream from which they have been separated by the centrifugal force in the upper cylindrical region 12. To reduce this tendency, a hemispherical baffle 34 is provided so that only a narrow annular region 36 exists through which the particles and dust can fall from the rotating air stream in the region 12, into the drum 14. The baffle 34 serves to separate the rotating air stream in the region 12 from the dust and particle content of the drum 14, and reduces the risk of the dust and particles in 14 becoming entrained in the rotating air stream in 12.

The hemispherical surface 22 merges into the oppositely curved hemispherical surface of the baffle 34 where they are both joined to the lower end of the conical housing 30.

The latter therefore provides the central support for the baffle 34 and for the hemispherical surface 22 containing the exit apertures 20.

It will be appreciated that the presence of the lower end of the conical housing 30 penetrates and therefore renders incomplete, the two hemispherical surfaces 22 and 34.

Within the upper cylindrical region 32 is located a turbine shown designated 38 carried by a central hollow axle 40, the lower end of which is formed with a frusto-conical surface 42 which serves as a cyclone starter for the conical chamber 30.

Air entering the cylindrical region 32 via port 28 causes the turbine to rotate and the rotating air stream set up by the tangential entrance of port 28 into the cylindrical region 32 causes a downwardly spiralling cyclone in manner known per se. Dust and particles entrained in the spiralling air stream tend to be deposited at the lower end of the conical chamber 30 where they pass through a circular opening 44 into a secondary collecting bin 46 after first circulating around a helical baffle 48 at the upper end of the secondary bin 46.

The latter is also conical in configuration and is complementary to the conical housing 30. The interior of the conical secondary bin 50 serves to collect dust and particles separated by the cyclone established in the conical chamber 30 but it will be seen that the wall of the secondary bin 46 separates the interior 50 from the annular region 52 within which the separated dust and particle content from the primary air stream bin 12, are collected.

The centre of the helix 48 presents a flat circular end 54 a short distance below the cylindrical passage 44 leading from the end of the conical chamber 30, and typically the diameter of 44 is of the order of 10 mm and the distance between the open end of 44 and the plate 54 is of the order of a few millimetres. The downwardly ascending spiral of air within 30, reverses near the lower end 30 to form an upward spiralling central cyclone (not shown) which moves in the general direction of the arrow 56 to pass into and through the hollow interior 58 of the axle 40, and to enter a cylindrical region above the cylindrical region 32 housing the turbine 38. The passage from 58 into 60 is through windows such as 62 in a frusto-conical shaped spinner 63 which is mounted on the axle 40 so as to rotate with the turbine 38. Upper and lower walls of the spinner 64 and 66 respectively are closed, so that air passing into the central region of the spinner 63 can only exit through the windows such as 62. Radially extending flanges such as 65 located between the windows, impart rotation to the exiting air stream as it enters cylindrical region 60, and the air spirals upwardly through the chamber 60 further assisted by a rotating helix 68 mounted on a second horizontal axle 70 which rotates with the spinner 63.

Air from 58 cannot pass axially into the interior 78 of the second hollow axle 70, but has to pass through the windows 62 and after circulating around chamber 60, can either pass into the interior 78 of the upper axle 70 via holes such as 80 in the wall of the upper axle or can leave the chamber 60 via exit 82 to re-enter the air stream below the spinner 63 via an inlet port 84 located in the cylindrical region 32 at the upper end of the conical cyclone chamber 30. The port 84, like entrance port 28, merges with the cylindrical region 32 in a tangential sense so that incoming air from 82 will circulate around the cylindrical region 32 and further assist in rotating the turbine 38 and will merge with the incoming air stream via 28, to traverse the conical chamber 30 once again before proceeding up the centre of 30 as previously described and enter the region 58.

Because of the way in which air is collected from the upper chamber 60 via the port 82, any air leaving via port 82 will preferentially include any dust or heavier than air particles relative to that near the centre of chamber 60 and therefore the return path to 84 will tend to include dust and particles which have not been separated by the final separation stage in the region 60, whereas air entering the region 78 via the holes 80 will tend to be free of dust and particles.

Although not shown in detail, 78 communicates with a suction device 79 such as a fan or turbine driven by an electric motor or the like, the action of which is to draw air in the direction of the arrow 74 from the apparatus shown in the rest of the drawing. It is this suction effect created by the rotating fan or turbine (not shown) which establishes the incoming air stream at 10 and the general flow of air through the apparatus as previously described.

It has been found that apparatus such as shown in FIG. 1 can operate at a very high efficiency of separation so that very little dust and particle content is left in the air flow leaving 78, and it has been found possible to dispense with the filter which is normally located at such a position in the vacuum cleaning apparatus just prior to the vacuum inducing fan or turbine. The presence of any such filter substantially reduces the air flow and therefore suction effect created by the fan and/or turbine, and by not having to include such a filter, the air flow through the apparatus, and therefore the air speeds within the various rotating air streams and cyclone is increased, and the separation efficiency enhanced.

Since the hollow axle 70 rotates with the spinner 63, and it is not desirable for the wall 86 to rotate, a rotational seal 88 is required between the rotating portion 70 and the stationary portion 86. This may for example comprise complementary chamfered end surfaces between the two cylindrical walls with bearing material at 90 and 92 as shown in FIG. 1A.

Although described as a single turbine, 38 may be formed from two similar turbine blade assemblies each occupying half the axial length of the turbine 38 as shown, and each secured on the axle 40 with the blades of one turbine staggered by half the pitch of the blades of the other turbine so as to effectively double the number of blades of the turbine and therefore increase its efficiency.

Figure 1B:
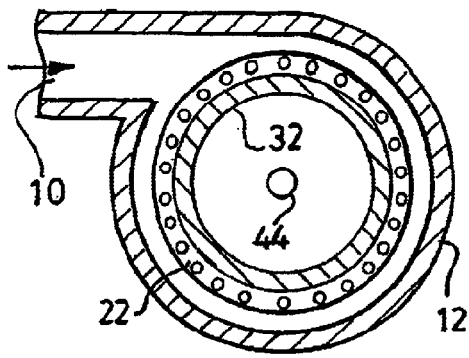
FIG. 1 is an elevation partly in cross-section, of a three stage cyclone vacuum cleaner (separator) in which the dust particles from the secondary stage are collected in a supplementary bin which is separate from the bin which collects the dust particles from the primary separator.
FIG. 1A is a detailed view of the rotational seal.

FIG. 1B is a cross-section view through the cylindrical region 12 of FIG. 1, and shows the tangential inlet 10 and the cylindrical form of the wall of the conical chamber 30 where it is sectioned, the small orifice at the lower end of the chamber 30, and the intermediate cylindrical outline of the wall 22 where the hemispherical surface 22 is cut by the cross-section.

Figure 1E:
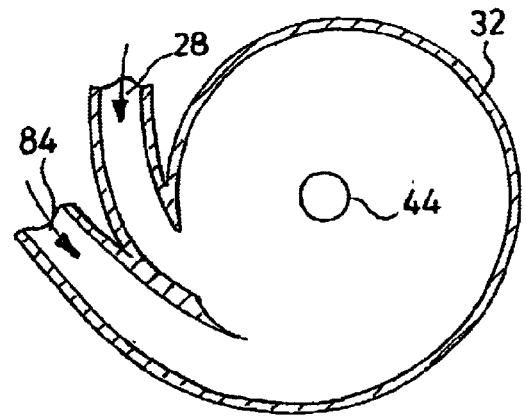
Figure 1C:
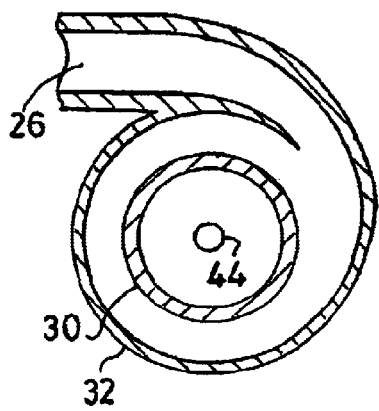

FIG. 1C is a cross-section through CC in FIG. 1, and shows how the exit port 26 communicates with the cylindrical region 24 and further assists in keeping the air mass rotating as it exits into the region 24 by virtue of the tangential exit 26 therefrom.

Figure 1F:
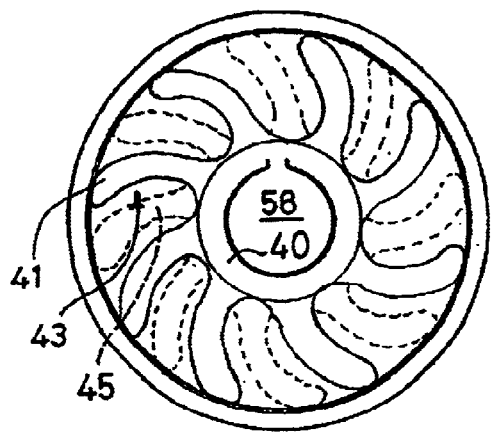
Figure 1D:
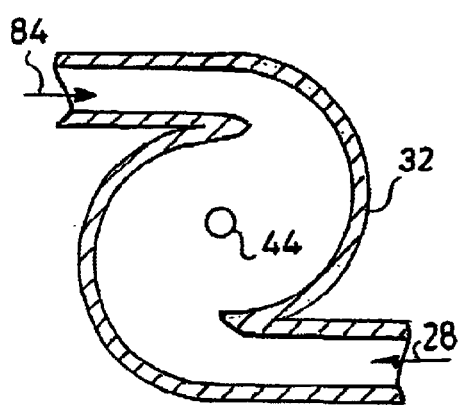

FIG. 1D is a cross-section on DD in FIG. 1, and shows one arrangement of inlet port 28 and return port 84 in the region of the turbine 38.

FIG. 1E is similar to FIG. 1D, but shows alternate positions for ports 28 and 84 if desired.

The important criterion is that a rotating air mass in 32 set up as air enters at 28 will tend to swirl past port 84 and continue in this circular motion around 32, rather than enter 84. In the same way, air re-introduced into 32 via 84 will likewise be swept into the rotating airstream induced by air entering by 28, and there will be no tendency for the air to enter the port 28 during its rotational movement within 32.

For clarity, the turbine blades are not shown in FIGS. 1D and 1E, but instead the turbine is shown in FIG. 1F. This shows hollow axle 40, central region 58 and eight curved turbine blades of which one is designated 41. As shown in FIG. 1F, the turbine is viewed from above, since it will be appreciated that air entering region 32 should be directed against the surface 43 of the blade 41 (and the corresponding surface of each of the other blades) to induce rotation of the turbine.

Where two turbines are mounted on the axle 40, each is of the same configuration as shown in FIG. 1F, but of half the axial depth of 38, so that the two will fit within the same axial space, and are mounted so that when viewed axially, the blades of one turbine will be seen to occupy the spaces between the blades of the other. The blades of the second turbine if fitted, are shown in dotted outline in FIG. 1F, and one of these is denoted by reference numeral 45.

Figure 1G:
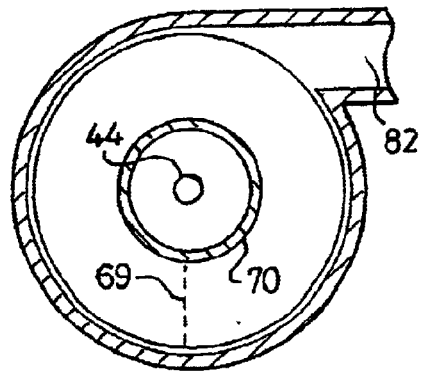

FIG. 1G is a cross-section through FIG. 1 on line GG and shows the exit port 82 communicating tangentially with the cylindrical interior 60 and the cylindrical wall 70 of the hollow axle on which the helix 68 is mounted, the upper end of which is shown at 69.

It will be appreciated that the helix is a relatively close fit within the cylindrical housing defining the chamber 60.

Although not shown in the drawing, it has been found advantageous for the openings 80 in the wall 70 to start a short distance after the beginning of the helix at the lower end 70 and to terminate a short distance prior to the end of the last turn of the helix at the upper end of 70.

Typically the apertures 80 are circular and have a diameter of 1.7 mm and approximately 1200 such holes are formed in the wall 70.

Typically the helix has an angle in the range 2 to 10°, typically 4°.

FIG. 2 shows a modification to the lower end of the conical cyclone separation tube 30. The lower end terminates in chamber 31 instead of the cylindrical nozzle 44 of FIG. 1, and within the housing 31 is located a helix corresponding to item 48 of FIG. 1.

The gap between the upper surface 54 of the central region of the helix 48 and the lower end of the conical tube 30 is selected so as to achieve the desired objectives, namely free ingress of dust and particles in the direction of the arrows 33 and 35 into the helix and thereafter into the lower region of the chamber 31, but minimal transfer of dust or particles in the reverse direction.

A cage 39 extends below the chamber 31 arranged symmetrically relative to the valve seat formed by the seal 37. Within the cage is a ball 41 which can cooperate with the valve seat seal 37 to close the opening into the chamber 31. The density of the ball is selected so that a rising air stream passing in an upward sense through the cage into the chamber 31 will cause the ball to lift and become a valve closure member as it seals against the lip seal 37.

The cage includes a base 43 the internal upper face of which is formed as a shallow pyramid at 45 to space the ball from the base of the cage when air flow is zero, and the ball can fall under gravity to leave the opening defined by the valve seat seal 37, open.

When the FIG. 1 apparatus is modified as shown in FIG. 2, the secondary bin 46 can be dispensed with. The whole of the drum 14 is now available for storing any dust and particles collected by the separation process whether in the primary separation stage in the cylindrical region 12 or in the secondary stage caused by the reverse cyclone effect within the conical housing 30.

The FIG. 2 arrangement enables this since as soon as air flow is established in the apparatus, some of the air entering at 10 will divert into the lower part of the drum 14 and rise up through the cage 39, the opening defined by the valve seat 37, through the helix 48 and into the conical housing 30. However air flow will lift the ball 41 into engagement with the seal 37 (as shown in dotted outline) to close the opening at the lower end of the chamber 31 and thereafter the apparatus will operate substantially as described with reference to FIG. 1. The chief difference is that particles and dust separated by the cyclone effect in the conical housing 30 will now leave in the direction of the arrows 33 and 35 and after traversing the helix 48 remain in the small chamber 31. When the air flow ceases as at the end of a cleaning session, the ball 41 immediately drops to its lower position from the one shown in dotted outline in FIG. 2, and any dust and dirt particles in the chamber 31 will fall through the opening around the ball, and out through the openings in the cage 39, to join the rest of the dust, dirt particles collected within the main drum 14.

Whenever the apparatus is powered up again, air flow is once again established, and the process is repeated, with the initial closing of the opening by the engagement of the ball 41 with the seal 37, and the collection of dust and dirt particles in chamber 31. When the apparatus is again powered down, dust and dirt particles collected in 31 will again leave the chamber via the now open valve seating and join the rest of the dust and dirt particles in the main drum 14.

The ball 41 and seal 37 therefore represent a one-way valve which, in combination with the helix 48, prevents dust and dirt particles from entering the lower end of the conical housing 30 when air flow is established. This effectively creates a secondary bin for the dust and particles collected from the secondary separation which occurs in the conical housing 30, until it is opportune to mix the dirt particles and dust collected therein with those in the remainder of the drum 14.

FIG. 3 illustrates an alternative cyclone separation apparatus also incorporating the features associated with the primary separation stage and dust collecting bin 14. Thus dust laden air entering at 10 is as before, caused to move in a circular path within region 12. Dust particles tend to fall towards the bottom of the bin 14 and air with substantially less dust particles contained within it passes through the small holes 20 and into the manifold region thereabove to exit via 26.

In the arrangement shown in FIG. 3, the now dust depleted air flow passes into the upper end of an intermediate chamber 90 via inlet port 92. As with inlet port 20, inlet port 92 is tangential to the generally circular cross-section of the chamber 90 and as before, the incoming air is caused to follow a rotational path which since there is no exit in the upper region of the chamber 90, begins to travel down a helical path defined by a helix 94 which is a close fit within the chamber 90, around the central hollow stem 96.

Air flow out of the chamber 90 is via a large number of very small holes formed in the wall of the hollow stem 96. The latter communicates with an upper chamber 98 within which is located another helix 100 the purpose of which will be described later.

One of the holes in the wall of the stem 96 is denoted by reference numeral 102. It has been found advantageous that the holes begin a short distance (measured around the stem) after the helix has started 96, and terminate a short distance (measured around the stem) before the helix finishes.

In one arrangement, a circumferential length of approximately 15 mm of unperforated stem wall exists at one end of the helix and approximately 40 mm measured circumferentially of unperforated stem wall exists at the other end of the helix, in each case the circumferential length being measured from the adjacent end of the helix around the stem.

Below the last turn of the helix, the stem 96 extends downwardly in the lower regions of the chamber 90 and terminates in a conical closure 104 which may also be apertured.

The rapidly moving dust particles will tend to fly out to the outer circumferential regions of the helix and continue down into the lower regions of the chamber 90. Thereafter they will pass down through the helix 48 and collect in the lower region of the small collection chamber above the non-return valve formed by the ball 41, and will be released into the collecting bin 14 at the end of the vacuuming session as described in relation to FIG. 2.

The air which passes through the small holes 102 and rises through the hollow interior of the stem 96 will be further depleted in terms of dust and dirt particles and will rise into the upper chamber 98 and be deflected by the downwardly extending conical end 106 at the lower end of the cylindrical tube 108 the upper end of which communicates with the source of the vacuum (not shown), such as a motorised fan or turbine.

Intermediate its ends, a helix 100 extends around the tube 108 and is a close fit within the cylindrical housing 98 in a similar way that the helix 94 occupies chamber 90. However no apertures are formed in the wall of the tube within the turns of the helix. Instead a region 110 of the tube between the lower end of the helix and the downwardly facing conical closure 106 is formed with a perforated wall containing a large number of small apertures, one of which is denoted by reference 112.

Air entering the chamber 98 will in part pass through the holes 112 and rise upwardly through the tube 108. The air which does circulate will tend to be that which is in the central region of the air stream which has not been significantly deflected by the effect of the downwardly deflecting cone 106. The effect of the cone has been found to introduce a further degree of separation in that particle laden air will tend to carry on in a straight line after being deflected by the cone and will tend to enter the helix 100 rather than change direction and enter the small holes 112 in the section 110. Once the particle laden air has entered the helix, it can only traverse the chamber 98 via the helix, and leave via exit 114 at the upper end of the chamber 98 from where it is returned to a second or return inlet 116 at the upper end of the intermediate chamber 90. There it entrains with the incoming air stream from inlet 92 and any dust particles remaining in the air stream will tend to be thrown out by the circular motion of the air as it progresses down the helix 94 once again for collection as described in the small chamber below the helix 48, leaving clean air to pass through the apertures 102.

Very high separation efficiencies have been achieved using apparatus such as shown in FIG. 3.

The lower end of the cage 39 shown in FIG. 2 and in FIG. 3, incorporates a level sensing device such as shown in FIG. 4. As shown in FIGS. 2 and 3, the lower end of the cage 39 comprises a shallow angle frusto-conical housing and this is shown in more detail in cross-section in FIG. 4.

The interior of the frusto-conical housing 118 houses a microswitch 122 having an operating arm 124 which if depressed in an upward sense will change the state of the switch.

A flexible membrane-diaphragm 126 extends across an opening in the underside of the housing 118. The diaphragm is held in place by a circlip or other retaining device 128 and is designed to be such that if the height of the heap of dust and dirt particles in the bin 14 becomes such as to make contact with and press against the membrane-diaphragm 126, the switch will be operated and the contacts will be closed (or opened as the case may be).

An electrical connection such as 128 connects the switch contacts to a relay or contactor so that if the switch is operated, power is removed from the suction motor so that the apparatus ceases to function. A warning signal may be generated, either visibly or audibly to indicate to the user that the bin is now full and should be emptied before any further usage occurs.

Although not shown, signal warning means may be provided on the apparatus preferably of a visible nature to explain by way of a warning message or coded sign that the condition exists requiring the bin to be emptied. Typically this may comprise an LED display or a simple electromechanically moved vane which moves so as to display a differently coloured area of the vane in a window, eg a green region of the vane is now replaced by a red region indicating that the bin is full, once the microswitch is operated.

Although described in relation to the FIGS. 2 and 3 embodiment, a level sensing device may also be incorporated into either the inner or outer collector 50, 52 of FIG. 1. Where a warning signal is generated, in association with the FIG. 1 arrangement, this conveniently indicates whether it is the inner or outer collecting bin which has become full.

In the alternative separator shown in FIG. 5, particle laden air is sucked into inlet 174 once a vacuum is established by operating a motor-driven vacuum producing fan/turbine 176. The incoming airflow is generally tangential to the wall of the cylindrical housing 178 and is thereby caused to form a circulating air mass around the region 180, at the upper end of the housing. Centrally is located a cylindrical vortex inducer 182 which extends into a hemispherical shell 184 containing a large number of very small openings 186 through which air can pass.

Below the surface 184 is located a similar but oppositely convexly curved shroud 188, which extends almost to the internal wall of the housing 178. Centrally of 182 and 184 a frusto-conical tubular surface 185 extends in an axially downward manner to communicate with an opening 190 in the centre of the shroud 184. A lightweight ball 192 which will normally occupy the lower end of housing 194, will, under the effect of a rising airflow through the housing 194, rise to engage and close off the opening 190 as shown in dotted outline at 192'.

The rapid circulation of air around 180 will tend to separate particles in the airstream from the air by virtue of centrifugal forces, so that the particles will migrate to the wall of the housing 178 and fall under gravity, past the shroud 188, into the particle collating region 196 of the housing 178. The latter is in two parts, the upper part 180 and the lower part 196, and the latter has a handle 198 to assist in carrying it when full to be emptied.

The vacuum-source 176 inducing an airflow through 174, does so via the openings 186, so that the incoming airflow will eventually change direction and pass through the openings 188 and pass via the hollow interior of the shell 184 and vortex actuator 180 into a manifold 200 which has an exit at 201 from where the now largely particle-free air is conveyed via a pipe (not shown) to an inlet 202 of a further separation stage contained within a cylindrical housing 204 mounted coaxially above the housing 178 and manifold 200. The housing 204 includes a first downwardly extending frusto-conical axial extension 203 which leads to a second frusto-conical member 206. The interior of 204 communicates with the particle collecting bin 196 when the ball valve 190, 192 is open, and the frusto-conical member 106 provides the frusto-conical surface 85 previously referred to.

Centrally of the housing 204 is a downwardly extending tube 208 the lower end of which is capped at 210, the cylindrical wall of the cap being apertured at 212.

Above the cap 210 is a two-turn helical baffle 214 at the upper end of 204, circumferentially remote from 202 in a second inlet 216 to which particle-containing air from the third stage is returned.

Although a helical baffle has been shown as required above the ball valve in FIG. 3, it has been found that provided there is a sufficient distance between the underside of 210 and the opening 190 in FIG. 5, no helical baffle is required in the FIG. 5 arrangement.

The tube 208 serves as the air outlet from 204 and the airstream passing up through 208 is circularly deflected in all directions by a downwardly facing conical end 218 of a cylindrical closure of an axially extending tubular member 220 in a cylindrical housing 222. The cylindrical wall of the closure is apertured as at 224 to provide an exit from the interior of 222, to the suction source 176.

Particle-containing air from 208 tends to give up the particles as the air deflected in a radial sense on meeting the conical end face 218 abruptly changes direction and returns in a radial sense towards the openings in the cap 218 as it meets the interior of the housing 222. Particles will tend to be drawn into the lower end of a three turn helix 226 and after traversing the helix the particles leave the housing 222 via exit 228 to be returned via a pipe (not shown) to inlet 216 in chamber 204, to mix with the incoming particle laden air from 202, to be separated therefrom by once again travelling the helix 214 and the vortex travelling to and from the lower end of 206.

Substantially particle free air exits via the openings 224 through tube 220 to the suction source 176 and it is found that overall separation can be so effective that there is no need for any filter in the path through 220 to the source 176.

As shown in FIG. 6, the ball is freely contained within a cylindrical housing 194 the upper end 230 of which is sealingly secured to the lower open end of the shroud 184 of FIG. 3. Radial protrusions 232, 234 prevent the ball from falling through the lower open end of the housing 194—and as shown in FIG. 7, four such radial protrusions are provided, 232, 234, 236 and 238. Near the open upper end of the housing 194 is an annular protrusion 240 which forms a valve seat which co-operates with the ball 192 to close off the passage of air through the opening 242 defined by the annular protrusions 240, when the ball is lifted (as by airflow in an upward sense) when vacuum is first applied to the system.

Where the diameter of the ball 192 is somewhat less than that of the interior of the housing 194, particles which collect above the ball 192 (when in its upper position shown at 192') can fall past the ball and out through the spaces such as 244, 246, 248 and 250, to exit the housing into the bin 196.

A level sensing device (not shown) may be incorporated into the design of separator shown in FIGS. 5 to 7.

FIGS. 7 and 8 illustrate how a different type of valve from that shown in the earlier Figures, can be used. The valve is located in a housing 251 and comprises a conical poppet 252 at the lower end of a spindle 254 at the upper end of which is a cup 256. A valve seating 258 retains an O-ring 260 against which the conical surface of the poppet 252 is forced, to close the valve once the airflow has been established through the apparatus. The spindle 254 extends through the poppet and is slidingly received in a guide 262 in a cross member 264 which extends across the lower end of the housing 251. The cross member 264 and guide 262 are shown in the scrap view of FIG. 8A.

Particles can pass down through the open end of tube 30 or 185 (see FIGS. 1 and 5) during operation, and remain above the poppet 252 until airflow ceases, whereupon the poppet drops and particles can fall past the conical surface of the poppet and around the cross member 264, into the common bin 14.

A spring (not shown may be fitted between the conical surface 252 and the upper end 266 of the enclosure 251, (or between the cup 256 and the end 266) so that as soon as airflow drops, the poppet valve opens under the action of the spring.

The apparatus described herein may also be used for separating liquids (eg water) from gases (eg air) since in general liquids are more dense than gases. If solid particles are also present of material having a density greater than the gaseous and liquid phases, these can also be separated from the gaseous phase along with the liquid phase, and in a second pass through the apparatus or by passage through a second similar apparatus, the solids can be separated from the liquid phase, provided the relative densities are sufficiently different.

In any situation where liquid is involved, a liquid trap or filter may be provided if the suction source would become contaminated or damaged by liquid reaching it, such as if it comprises a fan driven by an electric motor, or steps may be taken to separate any liquid from the motor. Alternatively a non-electric pump may be used which is not affected by the passage of liquid therethrough.

Where a helix is shown in any of the drawings the angle of the helix is typically in the range 20° to 10° and preferably of the order of 4°.

What is claimed is:

1. Apparatus for separating particulate material from an airstream established by suction, comprising:
   (1) a primary separation chamber in which particles are separated from the airstream therein by centrifugal force;
   (2) a main particle collecting region into which the particles separated by the primary separation can fall under gravity;
   (3) a secondary separation chamber downstream of the primary chamber, to which air and particles not separated in the first chamber, pass;
   (4) an air outlet in the secondary chamber through which air substantially free of particles can exit;
   (5) an intermediate particle collecting region associated with the secondary chamber, in which particles collect after separation by centrifugal force from the air flowing through the secondary chamber;
   (6) a valve between the intermediate particle collecting region and a second particle collecting region, having a valve closure member which closes the valve while air flows through the apparatus but which opens the valve when airflow ceases, to allow particles in the intermediate region to pass into the second region;
   characterised in that the valve closure member presents a conical or frusto-conical surface to an annular seating which includes an O-ring against which the said surface engages when the valve is closed.

2. Apparatus as claimed in claim 1, wherein the second collecting region is separate from the main particle collecting region.

3. Apparatus as claimed in claim 1 wherein the main particle collecting region also comprises the second particle collecting region.

4. Apparatus as claimed in claim 1 in which the valve means is operable manually.

5. Apparatus as claimed in claim 1 in which the valve means is operable electrically.

6. Apparatus as claimed in claim 1 in which the valve operates in response to the flow of air through the apparatus so as to become closed when the air flow reaches and exceeds a given rate of flow, and opens when air fluid flow falls below a given rate of flow.

7. Apparatus as claimed in claim 1 in which a baffle is located between the intermediate and second regions to create a tortuous path for particulate material therethrough.

8. Apparatus as claimed in claim 7 in which the baffle is a helix.

9. Apparatus as claimed in claim 8 in which the entry point of the helix is spaced from the exit from the secondary separation chamber.

10. Apparatus as claimed in claim 9 wherein the gap between the entrance to the helix and the exit from the secondary separation chamber is in the range 4 to 6.4 mm.

11. Apparatus as claimed in claim 8, in which the helix has two complete turns.

12. Apparatus as claimed in claim 7 in which a gap of the order of 4 mm exists between the ball and a valve seating, when open.

13. Apparatus as claimed in claim 1 wherein spring means acts on the closure member in a direction to maintain the valve open.

14. Apparatus as claimed in claim 1 further comprising a level sensing device in the or each particle collecting region to indicate when the contents of the collecting region has reached a given level, requiring it to be emptied.

15. Apparatus as claimed in claim 14 in which the sensing device includes a switch generating an alarm and/or for interrupting the power supply to the suction producing means.

16. Apparatus as claimed in any of claim 1 characterised in that the air is replaced by a liquid and the material to be separated therefrom is particulate material or another more dense liquid.

* * * * *